United States Patent
Chen

(10) Patent No.: US 9,267,612 B2
(45) Date of Patent: Feb. 23, 2016

(54) ANTI-PRESSURE CERAMIC VALVE

(71) Applicant: Mei-Li Chen, Taichung (TW)

(72) Inventor: Mei-Li Chen, Taichung (TW)

(73) Assignee: KUCHING INTERNATIONAL LTD., Taichung (TW)

( * ) Notice: Subject to any disclaimer, the term of this patent is extended or adjusted under 35 U.S.C. 154(b) by 104 days.

(21) Appl. No.: 14/067,327

(22) Filed: Oct. 30, 2013

(65) Prior Publication Data

US 2015/0115188 A1    Apr. 30, 2015

(51) Int. Cl.
*F16K 11/078* (2006.01)
*F16K 31/60* (2006.01)
*F16K 27/04* (2006.01)

(52) U.S. Cl.
CPC ........... *F16K 31/602* (2013.01); *F16K 11/0782* (2013.01); *F16K 11/0787* (2013.01); *F16K 27/045* (2013.01)

(58) Field of Classification Search
USPC ............... 137/315.13, 315.14, 315.15, 454.2, 137/454.6, 625.17, 625.4, 625.41; 251/88
See application file for complete search history.

(56) References Cited

U.S. PATENT DOCUMENTS

| | | | | |
|---|---|---|---|---|
| 4,226,260 A * | 10/1980 | Schmitt | | 137/315.13 |
| 4,502,507 A * | 3/1985 | Hayman | | 137/625.4 |
| 5,303,736 A * | 4/1994 | Orlandi | | 137/625.4 |
| 6,009,893 A * | 1/2000 | Chang | | 137/98 |
| 7,108,012 B2 * | 9/2006 | Rosko et al. | | 137/625.4 |
| 8,191,567 B2 * | 6/2012 | Lorch | | 137/315.13 |
| 2004/0069358 A1 * | 4/2004 | Knapp et al. | | 137/625.17 |
| 2004/0094213 A1 * | 5/2004 | Knapp | | 137/625.17 |
| 2008/0023085 A1 * | 1/2008 | Rosko et al. | | 137/625.4 |
| 2012/0222763 A1 * | 9/2012 | Yang | | 137/625.4 |

* cited by examiner

*Primary Examiner* — Kevin Murphy
*Assistant Examiner* — Jonathan Waddy
(74) *Attorney, Agent, or Firm* — Egbert Law Offices, PLLC

(57) ABSTRACT

An anti-pressure ceramic valve includes: a valve casing; positioning slots configured near the upper opening of the valve casing; a combination-type top base fixed on the upper opening of the valve casing, forming a flanged tube portion extending upward from the center of the flange; positioning snaps raised from the periphery of the combination-type top base to match and fix with the positioning slots; a water-controlling component housed inside the holding space of the valve casing, including a driving base, a valve stem, a turning valve plate, and a fixing valve plate; a base, fixed onto the lower opening of the valve casing to limit the assembly of the water-controlling component; an anti-pressure gap, formed between the positioning snaps and the top wall of the positioning slot; and a sinking ring surface, formed on the top surface of the flange of the combination-type top base.

2 Claims, 5 Drawing Sheets

ANTI-PRESSURE CERAMIC VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a ceramic valve, and more particularly to an innovative design of an anti-pressure ceramic valve.

2. Description of Related Art Including Information Disclosed Under 37 CFR 1.97 and 37 CFR 1.98

The structure of a conventional ceramic valve 10 is as disclosed in FIG. 1, wherein, the upper half section of the valve casing 11 is usually an integral body formed through injection molding, with a crosswise top wall 13 integrally extending inward from the top of the side wall 12 of the valve casing 11, and then projecting upward to form a flanged tube portion 14. Based on this, the top wall 13 can limit the components of driving base 15, turning valve plate 16, and fixing valve plate 17 inside the valve casing 11. However, during actual applications, such a conventional structure is found to have the following problem: after the ceramic valve is installed inside the water tap valve spool 20, a nut 21 is used to lock and press on the top wall of the valve casing 10 of the ceramic valve to fix the ceramic valve 10, however, when the nut 21 presses downward, if the pressure is too high, due to the plasticity of the top wall 13 of the valve casing 11 of the ceramic valve 10, it will have a downward deformation under the pressure (as marked by Arrow L1). Even if the deformation is minimal, it will cause too tight contact between the driving base 15, the turning valve plate 16, and the fixing valve plate 17 inside the valve casing 10 (as marked by Arrow L2). Since the top wall 13 of the valve casing 11 is designed to press and limit the driving base 15, the turning valve plate 16, and the fixing valve plate 17, the assembly tightness between the components must be a result of precise calculations and evaluations by the ceramic valve manufacturers, and to maintain a good installation and operation state of the driving base 15, turning valve plate 16, and fixing valve plate 17, the assembly tolerance value must be within a very small error limit range. Therefore, when the above-mentioned nut is used to lock and position the ceramic valve, if the water tap installer applies an excessive pressure to cause a downward deformation of the valve casing top wall of the ceramic valve, the original reserved gaps between the driving base, turning valve plate, and fixing valve plate may disappear, causing too tight contact between the components, and consequent quality problems and defects of the finished products of the manufactured water taps.

There is one point to be additionally mentioned: in actual manufacturing of water tap products, the assembly of the whole water tap structure and the production of the ceramic valve are usually conducted in different factories. Therefore, it is very difficult to solve the above-mentioned problem in the downstream water tap assembly factory (because it is hard to control uniform locking pressure of the nut). This problem must be solved by the upstream ceramic valve manufacturer. Hence, it is an important technical challenge for the related manufacturers to find a solution to improve the structure of the conventional ceramic valve and solve the above-mentioned problem.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The "anti-pressure ceramic valve" disclosed by the present invention is technically characterized by the unique design and constitution of the valve casing, positioning slots, combination-type top base, positioning snaps, water-controlling component, base, anti-pressure gap, and sinking ring surface, so that the present invention provides an advancement over the existing structure of the "prior art": when the ceramic valve is installed in an existing water tap valve spool, the pressure from the tightening nut will be received only by the upper opening of the valve casing, not by the combination-type top base, so that the preset accuracy of the assembly of the driving base, turning valve plate, and fixing valve plate of the water-controlling component will not be affected. In this way, the water-controlling component will maintain its preset accuracy and operational quality after installation of the ceramic valve. Hence, the present invention is practically advanced and has a good value for industrial utilization.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
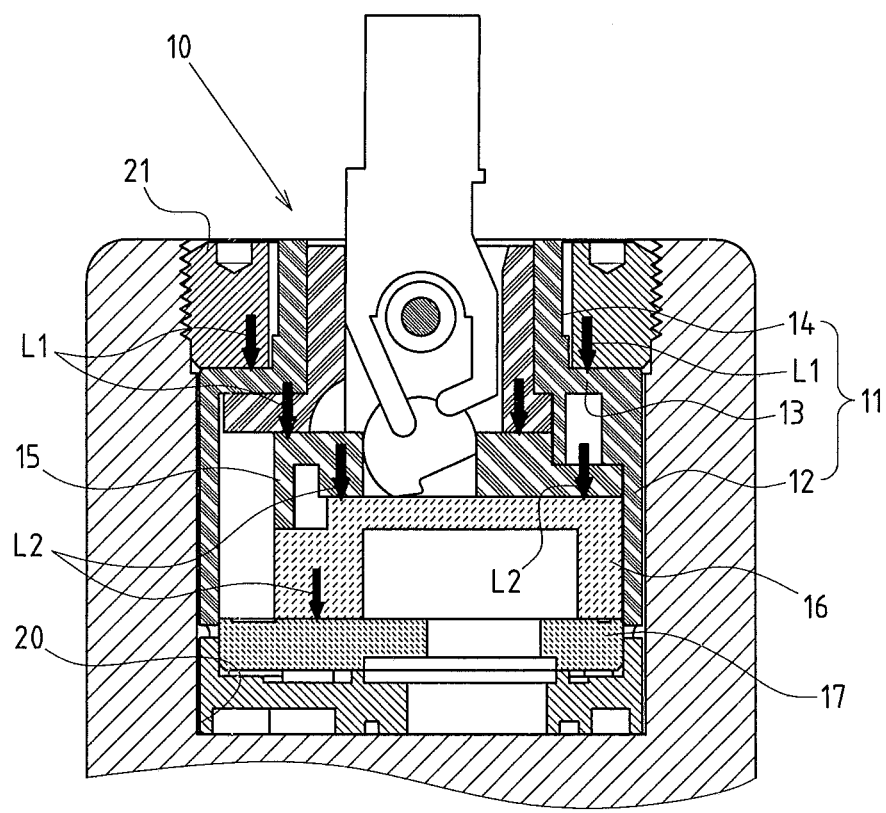
FIG. 1 is a sectional view of the structure of the conventional ceramic valve.
Figure 2:
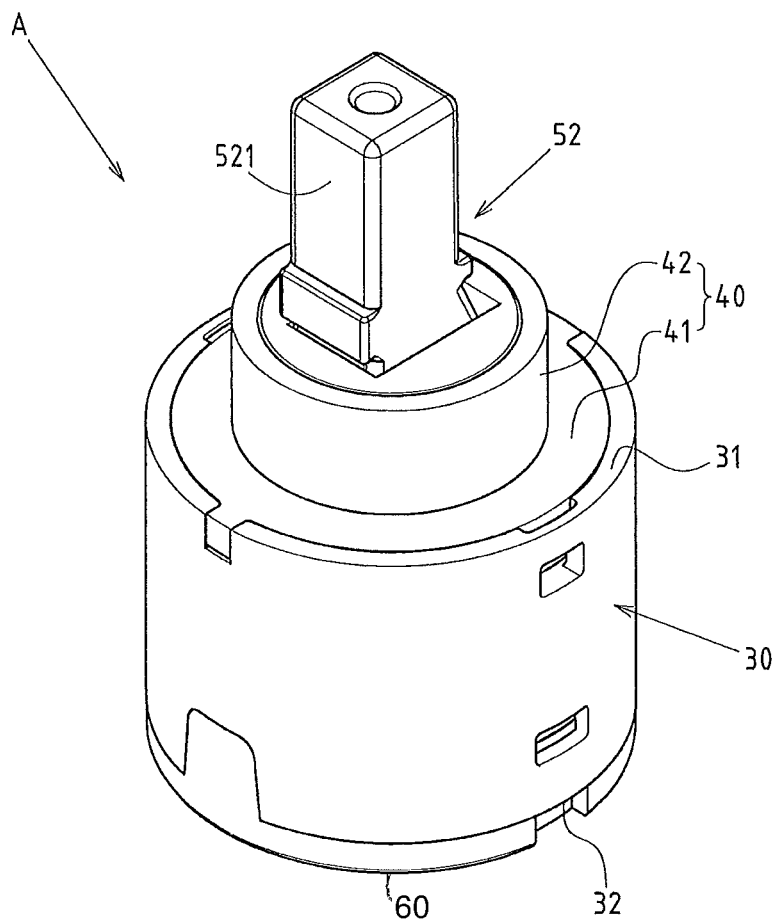
FIG. 2 is an assembled perspective view of a preferred embodiment of the ceramic valve of the present invention.
Figure 3:
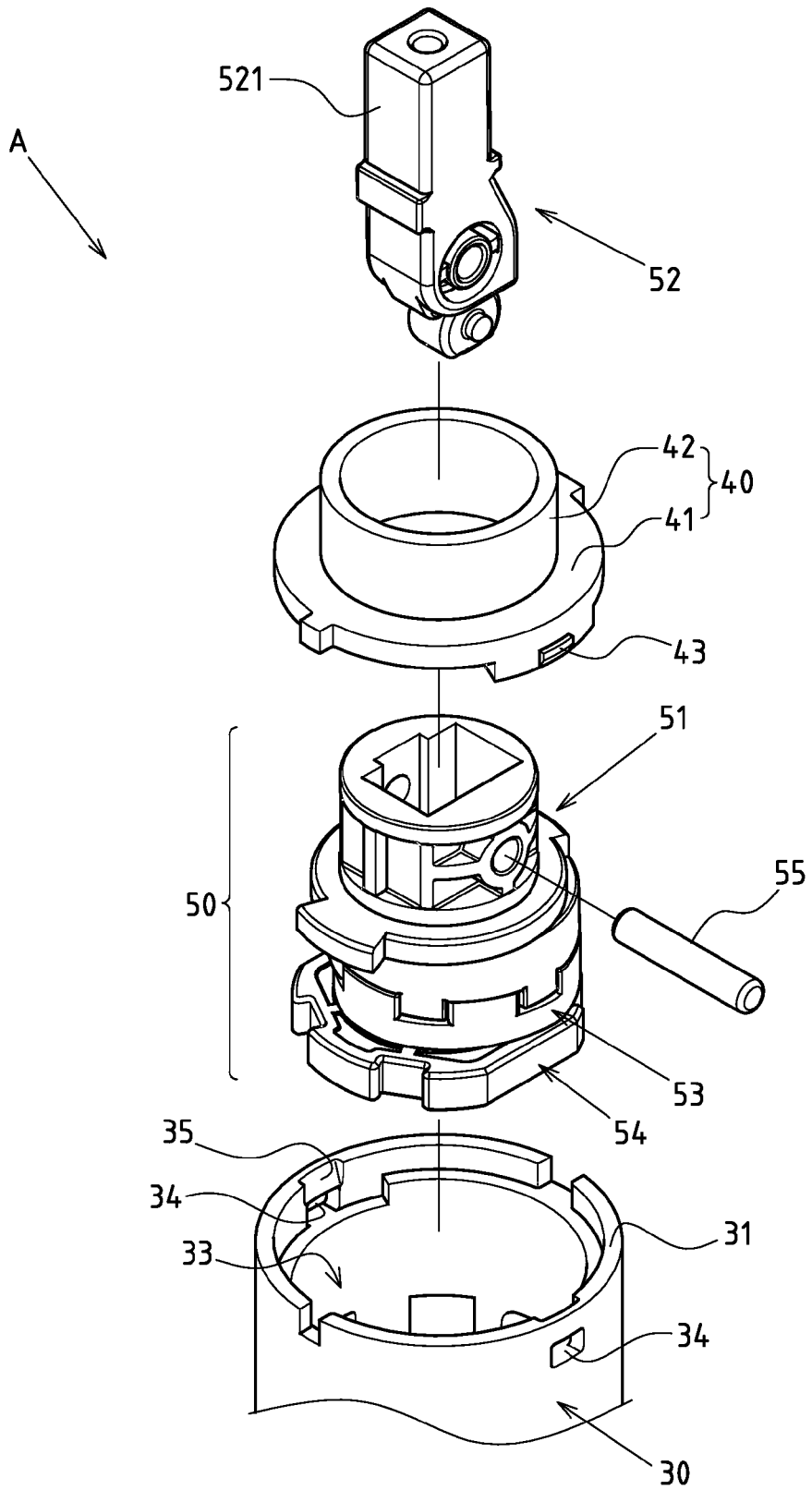
FIG. 3 is an exploded perspective view of a preferred embodiment of the ceramic valve of the present invention.

FIGS. 2 to 6 depict a preferred embodiment of the present invention of an anti-pressure ceramic valve. It is to be noted that such an embodiment is illustrative only and is not intending to limit the scope of the present invention.

Said ceramic valve A comprises a valve casing 30, made of plastic material and being a hollow cylinder, including an upper opening 31, a lower opening 32 and a holding space 33 between the upper and lower openings 31, 32.

At least two positioning slots 34, being a crosswise through-hole, are configured at a position on the valve casing 30 near the upper opening 31.

A combination-type top base 40, made of plastic material, is fixed on the upper opening 31 of the valve casing 30. The combination-type top base 40 forms a flanged tube portion 42 extending upward from the center of the flange 41.

At least two positioning snaps 43 are raised from the periphery of the flange 41 of the combination-type top base 40, to match and fix with the positioning slots 34 on the valve casing 30.

A water-controlling component 50 is housed inside the holding space 33 of the valve casing 30, including a driving base 51, a valve stem 52, a turning valve plate 53, and a fixing valve plate 54, wherein the driving base 51 is configured inside the flanged tube portion 42 of the combination-type top base 40 in a rotating state, the valve stem 52 is pivotally fixed on the driving base 51 through a cross shaft 55 and can swing vertically. Moreover, the top end of the valve stem 52 has a receiving section 521 extending upward from the driving base 51. The turning valve plate 53 is installed below the driving base 51 and can be driven to move by the bottom end of the valve stem 52, and the turning valve plate 53 is next to the fixing valve plate 54 on the upper side.

A base 60 is fixed onto the lower opening 32 of the valve casing 30, to limit the assembly of the water-controlling component 50.

An anti-pressure gap 70 is formed between the positioning snaps 43 and the top wall of the positioning slot 34.

A sinking ring surface 44 is formed on the top surface of the flange 41 of the combination-type top base 40. The sinking ring surface 44 has a sinking distance relative to the upper opening 31 of the valve casing 30 (marked by H1 in FIG. 6).

Figure 4:
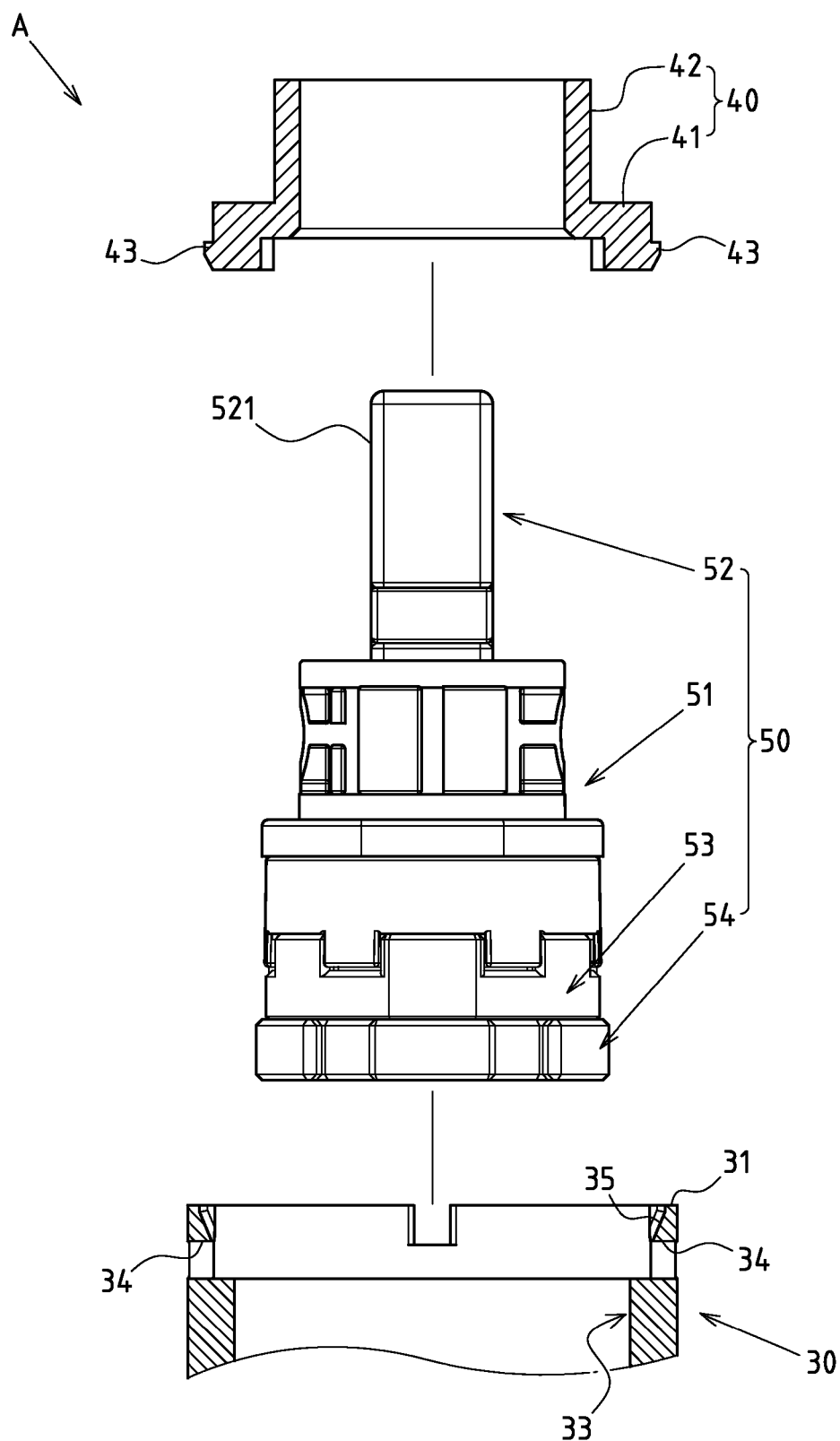
FIG. 4 is an exploded sectional view of a preferred embodiment of the ceramic valve of the present invention.
Figure 5:
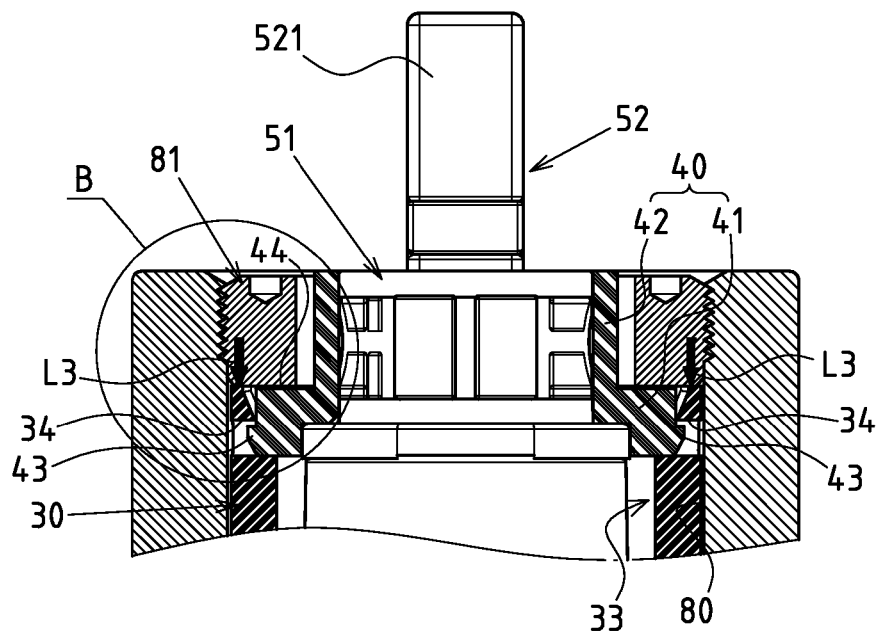
FIG. 5 is an assembled sectional view of a preferred embodiment of the ceramic valve of the present invention.
Figure 6:
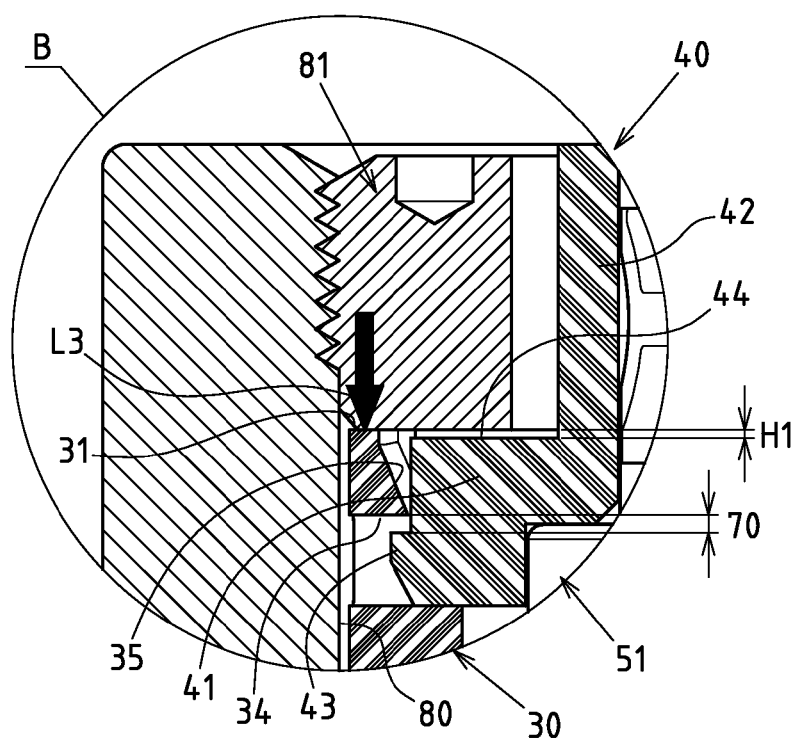
FIG. 6 is a partially enlarged view of Part B in FIG. 5.

The above-described structure constitutes the design of the present invention. Referring to FIGS. 5 and 6, when the ceramic valve A is installed inside an existing water tap valve spool 80, the locking pressure from the nut 81 (marked by Arrow L3 in FIGS. 5 and 6), will be received only the upper opening 31 of the valve casing 30, not by the combination-type top base 40. Moreover, even if the upper opening 31 of the valve casing 30 has some collapse or deformation under excessive pressure, because the sinking ring surface 44 formed on top of the flange 41 of the combination-type top base 40 has a sinking distance relative to the upper opening 31 of the valve casing 30 (marked by H1 in FIG. 6), the combination-type top base 40 will not be pressed. On the other hand, based on the configuration of the anti-pressure gap 70, there is a space between the positioning snaps 43 and the top wall of the positioning slot 34, when there is a downward deformation of the upper opening 31 of the valve casing 30, the positioning snaps 43 will not be pressed to affect the combination-type top base 40. Based on this, the preset assembly accuracy between the components of driving base 51, turning valve plate 53, fixing valve plate 54 of the water-controlling component 50 (as shown in FIG. 4) will not be affected, i.e., the preset accuracy of the water-controlling component 50 (the optimal tightness between the components) and operational quality can be maintained after installation of the ceramic valve A. Based on this, the above-mentioned problem can be effectively solved.

Referring to FIGS. 4, 5, and 6, at positions on the upper opening 31 of the valve casing 30 corresponding to the positioning slots 34, a slant guiding surface 35 can be provided, so as to guide the positioning snaps 43 configured on the periphery of the combination-type top base 40 to accomplish a locked state.

I claim:

1. An anti-pressure ceramic valve apparatus comprising:
   a valve casing formed of a plastic material, said valve casing defining a hollow cylinder, said valve casing having an upper opening, a lower opening, and a holding space between said upper opening and said lower opening;
   at least a pair of positioning slots each defining a crosswise through-hole in said valve casing adjacent said upper opening;
   a top base formed of a plastic material, said top base affixed on said upper opening of said valve casing, said top base having a flanged surface and a tubular portion extending upwardly from a center of said flanged surface, said top base having at least a pair of positioning snaps extending outwardly of a periphery of said flanged surface, the pair of positioning snaps respectively fixed in the pair of positioning slots, an anti-pressure gap being formed between at least one of the positioning snaps and at least one top wall of one of the positioning slots;
   a water-controlling component housed within said holding space of said valve casing, said water-controlling component having a driving base, a valve stem, a turning valve plate and a fixing valve plate, said driving base rotatably received within said tubular portion of said top base, said valve stem pivotally mounted on said driving base by a cross shaft, said valve stem having a receiving section at a top end thereof, said receiving section extending upwardly from said driving base, said turning valve plate positioned below said driving base, said valve stem having a bottom end cooperative with said turning valve plate so as to move said turning valve plate, said turning valve plate positioned on an upper side of said fixing valve plate; and
   a sinking ring surface formed on said flange surface of said top base, said sinking ring surface having a sinking distance relative to said upper opening of said valve casing.

2. The anti-pressure ceramic valve apparatus of claim 1, said upper opening of said valve casing having at least one slanted guiding surface extending toward at least one of the positioning slots so as to guide at least one of the positioning snaps toward its respective positioning slot.

* * * * *